(12) United States Patent
Gong et al.

(10) Patent No.: US 11,870,297 B2
(45) Date of Patent: Jan. 9, 2024

(54) PARALLEL SWITCHING SYSTEM AND RELATED SCHEDULING METHOD FOR MULTI-DEVICE COLLABORATIVE WORK THEREOF

(71) Applicant: Shenzhen ONE Energy Technology Co., LTD, Shenzhen (CN)

(72) Inventors: Wenbo Gong, Shenzhen (CN); Zhicheng Wei, Shenzhen (CN); Liang Tan, Shenzhen (CN); Jian Wang, Shenzhen (CN); Jinghui Shi, Shenzhen (CN)

(73) Assignee: SHENZHEN ONE ENERGY TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 17/849,953

(22) Filed: Jun. 27, 2022

(65) Prior Publication Data
US 2023/0352968 A1 Nov. 2, 2023

(30) Foreign Application Priority Data
Apr. 29, 2022 (CN) .......................... 202210474030.0

(51) Int. Cl.
*H02J 9/06* (2006.01)
*H02J 7/00* (2006.01)

(52) U.S. Cl.
CPC ............ *H02J 9/062* (2013.01); *H02J 7/0013* (2013.01); *H02J 7/0063* (2013.01); *H02J 7/0071* (2020.01)

(58) Field of Classification Search
CPC ........ H02J 9/062; H02J 7/0071; H02J 7/0013; H02J 7/0063
USPC .......................................................... 307/65
See application file for complete search history.

(56) References Cited

U.S. PATENT DOCUMENTS

| | | | |
|---|---|---|---|
| 10,340,732 B2 * | 7/2019 | Bach ........................ | H02J 9/061 |
| 2013/0193760 A1 * | 8/2013 | Colombi ................. | H02J 9/062 |
| | | | 307/64 |
| 2015/0061392 A1 * | 3/2015 | Berard ................... | G01R 31/42 |
| | | | 307/52 |

* cited by examiner

Primary Examiner — Michael R. Fin
(74) Attorney, Agent, or Firm — WPAT, PC (57) ABSTRACT

The disclosure discloses a scheduling method for collaborative work of multi-device in a parallel switching system, the method comprises: providing a load and N backup energy storage devices, n is a positive integer greater than or equal to 2; and connecting the AC output interfaces of the N backup energy storage devices to the load or assembling the AC charging interfaces of the N backup energy storage devices to form a parallel switching system and obtaining numbers 1 to N according to the sequence of the communication modules accessing Wi-Fi hotspots. When the backup energy storage device with any number is switched to the load in the power supply mode, the other backup energy storage devices are switched to the wire mode to transfer current. When the electric quantity of the backup energy storage device reaches the electric quantity threshold, the communication module of the backup energy storage device will notify another numbered backup energy storage device to start the AC output module, and then switch to provide power supply to the load in the power supply mode.

10 Claims, 8 Drawing Sheets

PARALLEL SWITCHING SYSTEM AND RELATED SCHEDULING METHOD FOR MULTI-DEVICE COLLABORATIVE WORK THEREOF

CROSS-REFERENCE TO RELATED APPLICATIONS

This application claims a priority of the following Chinese Patent Application: CN202210474030.0, filed on Apr. 29, 2022, the disclosure of which is incorporated herein in their entirety by reference.

BACKGROUND

Technical Field

The disclosure relates to a parallel switching system and a scheduling method for collaborative work of multi-device, and more particularly, to a scheduling method for collaborative work of multi-device using which is especially suitable for a parallel switching system with a certain sequence when a plurality of backup energy storage devices are used.

Related Art

Figure 1:
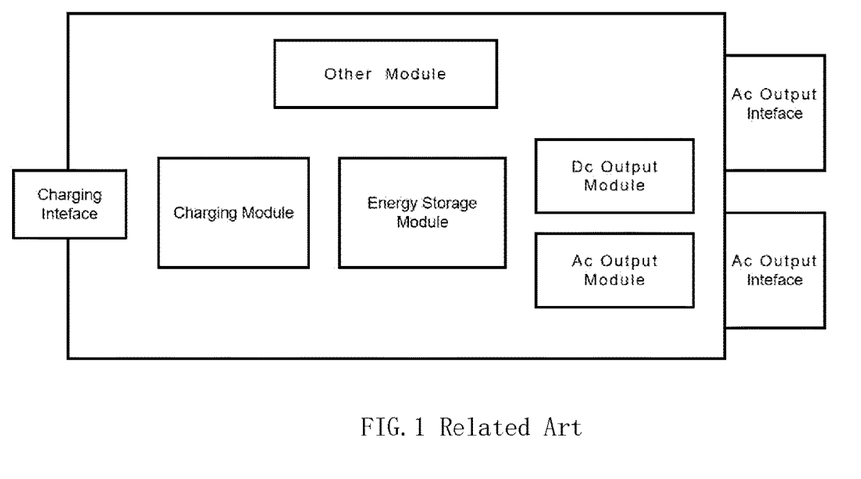
FIG. 1 is a schematic diagram of a backup energy storage device according the prior art.

As shown in FIG. 1, a backup energy storage device is a interfaceable power supply system, the backup energy storage device includes a DC output module (such as a DC to DC converter), a DC output interface (such as common a USB interface, on-board cigarette lighter, etc.), an AC output module (such as an inverter), an AC output interface, an energy storage module (such as a battery), a charging module (such as a DC or AC charging module), a charging interface, and other modules. The DC output module can be a DC module or a DC to AC module. The charging module can be an AC to DC charging module or a DC charging module. The charging interface can be AC, DC or both. Other modules include reality module, communication module, etc. Energy storage modules include battery energy storage modules.

Figure 2:
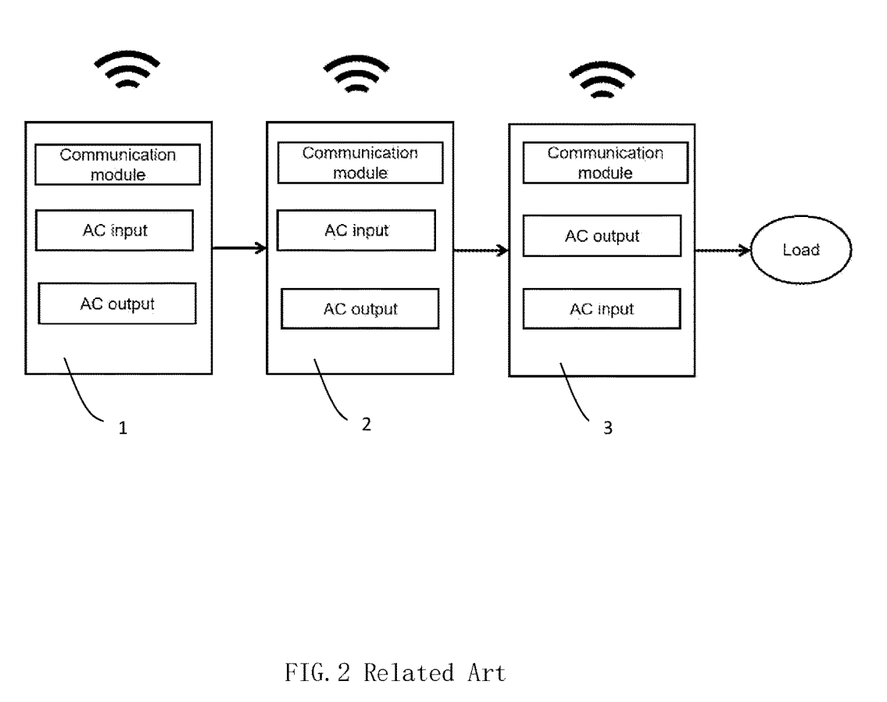
FIG. 2 is a schematic diagram of a backup energy storage device with multiple devices in series according the prior art.

At present, the energy storage device can be charged through the charging interface and the charging module, but the limited stored energy and the existence of high-power AC equipment in daily life make it impossible to guarantee the long-term and stable supply of AC power. In order to prolong the power supply time, the commonly used methods and their technical defects are as follows:

1. Multiple backup energy storage devices are used in series: the former backup energy storage device charges the latter backup energy storage device, and the latter backup energy storage device supplies power to the load. As shown in FIG. 2, a backup energy storage device 1 charges a backup energy storage device 2, the backup energy storage device 2 charges a backup energy storage device 3, and the backup energy storage device 3 provides charging function for a load equipment. However, using multiple backup energy storage devices in series may lead to insufficient energy use of a single backup energy storage device, power failure when switching backup energy storage devices, slow switching speed between systems, and additional power consumption of multi-device in series.

2. External expansion of energy storage modules: additional external energy storage modules can increase the storage energy of the system, but the more external expansion, the greater the weight. Moreover, the expansion of external energy storage modules will increase the difficulty of battery management, and there are risks brought by carrying energy storage.

In addition, the current backup energy storage system with multi-device working together requires manual setting of how the system should run, and fixed numbers are set for each device, which is not only inconvenient to operate, but also not intelligent.

To sum up, it is urgent to develop a new parallel mode of the backup energy storage system with multiple units working together, so as to extend the power supply time on the power side of the backup energy storage system. At the same time, when multiple backup energy storage devices work together, it is necessary to know the working conditions of other models, and even the connection sequence between other devices and oneself. Therefore, it is more urgent to develop a sort method based on Wi-Fi for backup energy storage devices.

SUMMARY

However, the vocabulary expression of the present disclosure is only used to describe some embodiments (whether or not already in the claims) disclosed in this specification, rather than a complete description of all possible embodiments. Some embodiments described above as various features or aspects of the present disclosure may be combined in different ways to provide backup energy storage devices of the parallel switching system more collaborative work by using the Wi-Fi scheduling method, using more than one backup energy storage device connected to the power supply in series, in parallel form, to achieve the purpose of prolonging the duration of power supply to load, make the backup energy storage device in the case of multi-device work together more better.

In order to achieve the above purposes, the invention provides a scheduling method for collaborative work of multi-device in a parallel switching system, the system comprises a plurality of backup energy storage devices, each backup energy storage devices comprises an AC charging interface, a switching module, an AC output interface, an AC output module, and a communication module, an output end of the switching module connected with the AC output interface, and an input end switched between the AC charging interface and the AC output module, enabling the backup energy storage device to be switched between a power supply mode and a wire mode. The scheduling method comprises: providing a load and N backup energy storage devices, n is a positive integer greater than or equal to 2; and connecting the AC output interfaces of the N backup energy storage devices to the load or assembling the AC charging interfaces of the N backup energy storage devices to form a parallel switching system and obtaining numbers 1 to N according to the sequence of the communication modules accessing Wi-Fi hotspots. When the backup energy storage device with any number is switched to the load in the power supply mode, the other backup energy storage devices are switched to the wire mode to transfer current.

Preferably, the backup energy storage device with a larger number is first switched to provide power supply to the load in the power supply mode, while the other backup energy storage devices are switched to the wire mode to transfer current.

Preferably, when the electric quantity of the backup energy storage device reaches the electric quantity threshold, the communication module of the backup energy storage device will notify another numbered backup energy storage device to start the AC output module, and then switch to provide power supply to the load in the power supply mode.

Preferably, when the backup energy storage device is switched in the power supply mode, the original backup energy storage device providing power supply to the load exits the Wi-Fi hotspot and is replaced with a new backup energy storage device, and the new backup energy storage device continues to use the original number.

Preferably, when the backup energy storage device for power supply does not work normally, the communication module of the backup energy storage device will notify another numbered backup energy storage device to start the AC output module, and then switch to provide power supply to the load in the power supply mode.

Preferably, when the backup energy storage device originally supplied with power recovers, the output module is started, and then the power supply mode of the original backup energy storage device is switched again, and the backup energy storage device currently in operation is notified by the communication module of the original backup energy storage device to switch to the wire mode.

Preferably, when a new backup energy storage device replaces the original backup energy storage device to provide power supply, the output module is started, and then the power supply mode of the original backup energy storage device is switched again, and the backup energy storage device currently in operation is notified by the communication module of the original backup energy storage device to switch to the wire mode.

Preferably, when a new backup type energy storage devices, new backup type energy storage device is added to the parallel switching system, the AC output module of the new backup type energy storage device is started, and then the power supply module of the new backup type energy storage device is switched to provide power supply to the load, the original backup energy storage device is switched to the wire mode, and the numbers of the other backup energy storage devices are adjusted accordingly.

Preferably, the plurality of backup energy storage devices are connected in a star shape, the AC output interface of one backup energy storage device is connected with the load, the AC output interface of another backup energy storage device is connected with the AC charging interface of the backup energy storage device, and the AC output interfaces of the other backup energy storage devices is connected with the AC charging interface of the other backup energy storage device.

Preferably, the plurality of backup energy storage devices are in parallel and the AC output interface of each backup energy storage devices is connected to the load.

As mentioned above, when a backup energy storage device fails to recover, the AC output module of the backup energy storage device is started, and then the switching state of the original working system is changed to ensure the stability of power supply.

The disclosure solves the technical problems of switching backup energy storage device with load power failure, insufficient use of energy and extra consumption of multiple devices when multiple devices are working in series, and has the following beneficial effects:

1. Switching between the AC charging interface connected to the AC output interface and the AC output module connected to the AC output interface through the switch module is simple, convenient and efficient.

2. Each backup energy storage device obtains numbers 1 to N in the order that the communication module is connected to the Wi-Fi hotspot, and supplies power to the load in the order of numbers N to 1. When one backup energy storage device supplies energy for the load, the other devices are connected to the AC output interface and the AC charging interface through the switch module, and connected together in the form of standby, so as to make full use of the stored energy.

3. When switching between the previous numbering system and the latter numbering system, the latter numbering system starts the output module and then switches the switch state, thus ensuring the stability of power supply during switching.

4. When a backup energy storage device is restored or a new system is added, the switch state of the original working system is changed after the normal operation of the restored or newly added system is ensured, so as to ensure the stability of power supply and facilitate the addition and removal of remote backup energy storage devices.

BRIEF DESCRIPTION OF THE DRAWINGS

In order to more clearly explain the embodiment of the present disclosure or the technical scheme in the prior art, the following will briefly introduce the attached drawings that need to be used in the embodiment. It is obvious that the attached drawings in the following description are only some embodiments of the present disclosure. For ordinary technicians in the art, without paying creative labor, other drawings can also be obtained from these drawings.

DETAILED DESCRIPTION

In order to more clearly explain the embodiment of the present disclosure or the technical scheme in the prior art, the following will briefly introduce the attached drawings that need to be used in the embodiment. It is obvious that the attached drawings in the following description are only some embodiments of the present disclosure. For ordinary technicians in the art, without paying creative labor, other drawings can also be obtained from these drawings.

Figure 3:
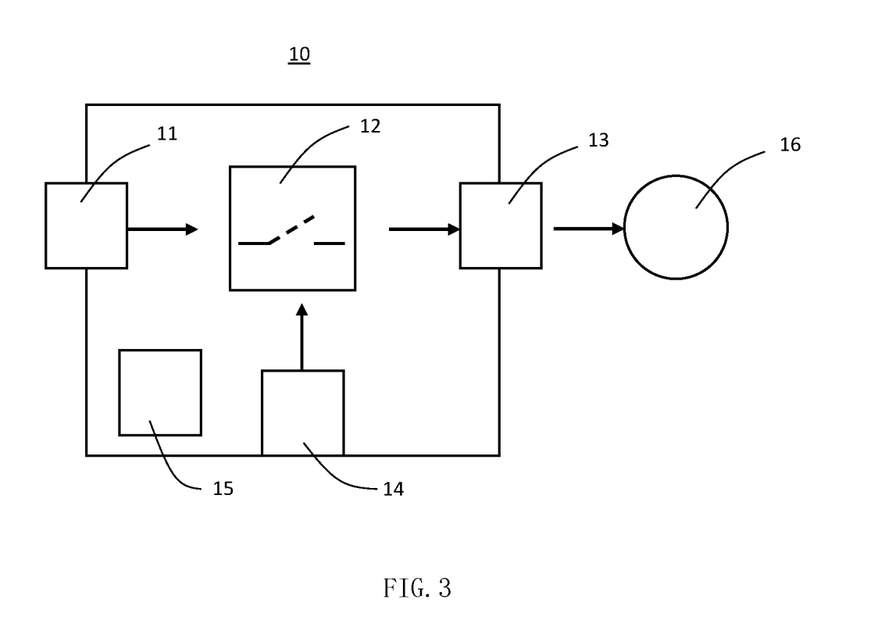
FIG. 3 is a schematic block diagram of a backup energy storage device according to the present invention.

The present disclosure provides a backup energy storage device 10, as shown in FIG. 3. The backup energy storage device 10 comprises an AC charging interface 11, a switch module 12, an AC output interface 13, an AC output module 14 and a communication module 15. The AC output interface 13 of the backup energy storage device 10 can be connected to the load 16 or the AC charging interface 11 of other backup energy storage device 10.

The switch module 12 has an input end and an output end, and the output end of the switch module 12 is connected with the AC output interface 13. The input end of the switch module 12 can be selectively switched between the AC charging interface 11 and the AC output module 14, so that the backup energy storage device 10 can provide switching between a power supply mode and a wire mode. In the power supply mode, the AC output module 14 is connected to the AC output interface 13 through the switch module 12, and the power supply current is output through the AC output interface 13. In the wire mode, the AC charging interface 11 is connected to AC output interface 13 through the switch module 12, and the power supply current is output through the AC output interface 13. In some embodiments, the switch module 12 may use relays or other switching devices such as field effect transistors.

The AC output module 14 is used to generate power supply current and can supply power to load 16.

In some embodiments, the AC charging interface 11, the switching module 12, the AC output interface 13, and the AC output module 14 may also be bidirectional devices, that is, compatible with DC current. Specifically, the AC charging interface 11 can be a DC charging interface, the AC output module 14 can be a DC output module, and the AC output interface 13 can be a DC output interface.

The backup energy storage device 10 further includes communication module 15. The communication module 15 is used to communicate with load 16 or other backup energy storage devices 10. According to the information sent by the load 16 or the other backup energy storage devices 10, the corresponding switch module 12 is controlled to switch the working mode. In some embodiments, the communication mode may be any wired or wireless (such as Wi-Fi, Bluetooth, etc.) mode. Moreover, the communication mode may not be point-to-point communication, but may also be one-to-many or broadcast communication mode.

Figure 4:
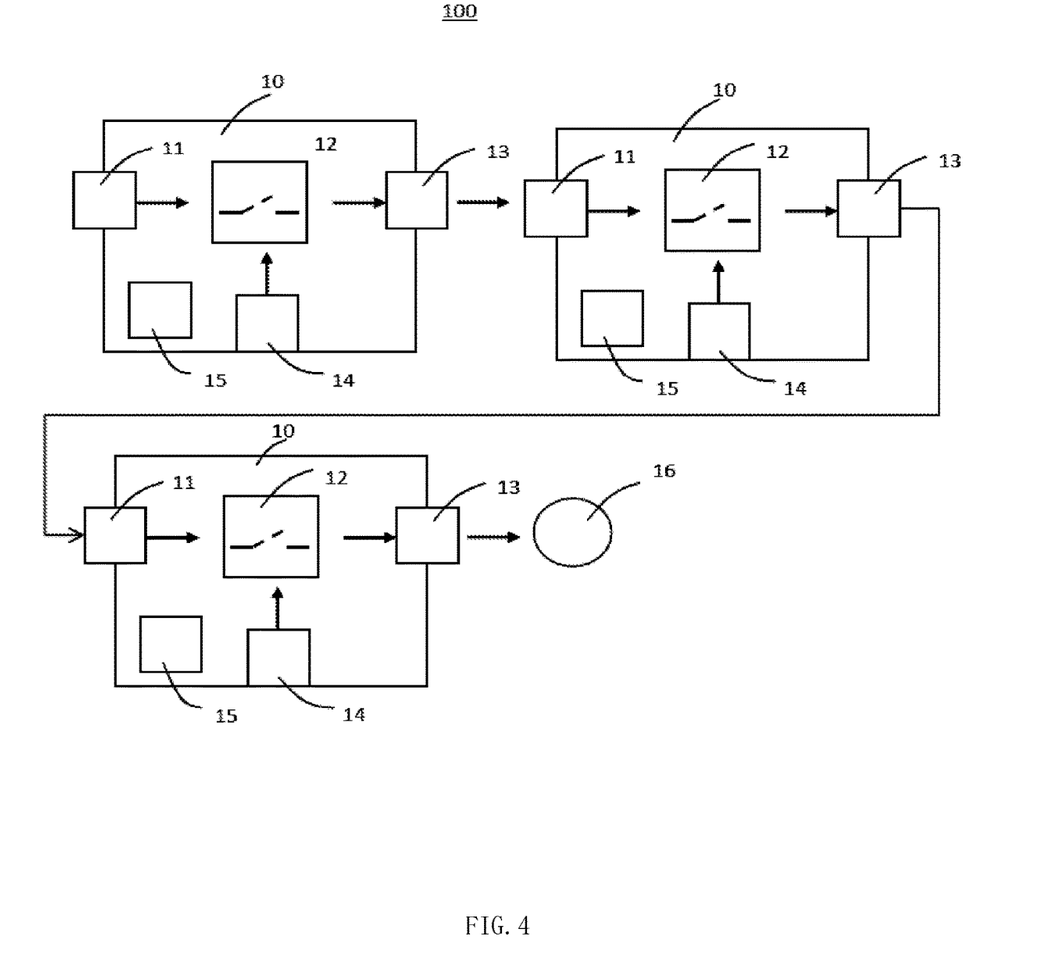
FIG. 4 is a serial connection principle block diagram of a parallel switching system according to the present invention.

As shown in FIG. 4, a parallel switching system 100 is provided for the present disclosure, including one load 16 and N backup type energy storage devices 10, N can be any positive integer greater than or equal to 2. As shown in FIG. 4, N is three, that is, the parallel switching system 100 includes three backup energy storage devices 10. Please refer to FIG. 5, which is a schematic diagram of the three backup energy storage devices 10 arranged in series depicted in FIG. 4. The backup energy storage device A, the backup energy storage device B and the backup energy storage device C respectively represent backup energy storage device 10 from near to far from the load 16. In this embodiment, when supplying AC power to the load 16, multiple backup energy storage devices 10 increase the service time of the load 16 in series. The backup energy storage device A, the backup energy storage device B and the backup energy storage device C communicate with each other through their own communication module 15. The backup energy storage device A, B and C can be switched between the power supply mode and the wire mode respectively.

Figure 5:
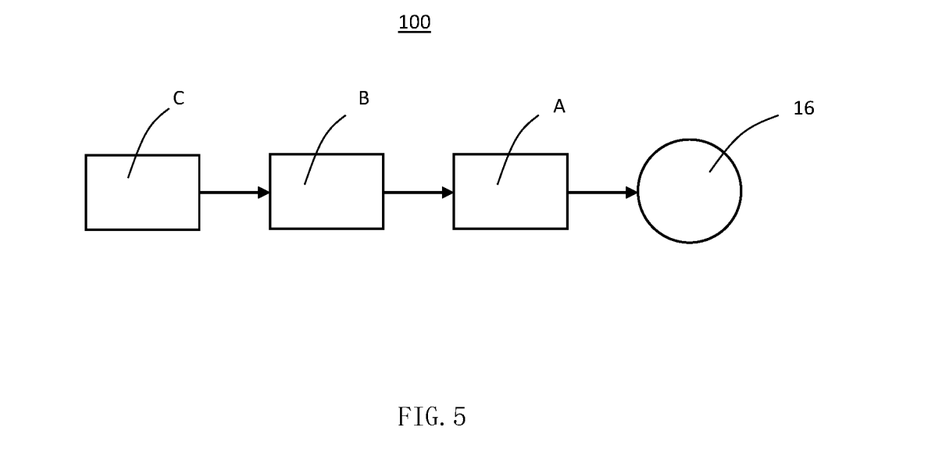
FIG. 5 is a schematic diagram of the three backup energy storage devices arranged in series depicted in FIG. 4.

The backup energy storage devices A, B and C respectively include the AC charging interface 11, the switch module 12, the AC output interface 13, the AC output module 14 and the communication module 15. The input end of the switch module 12 can be switched between the AC charging interface 11 and the AC output module 14, and the output end of the switch module 12 is connected to the AC output interface 13. The series method of the backup energy storage devices A, B and C is as follows: the AC load 16 is connected with the AC output interface 13 of the backup energy storage device A, the AC charging interface 11 of the backup energy storage device A is connected with the AC output interface 13 of the backup energy storage device B, and the AC charging interface 11 of the backup energy storage device B is connected with the AC output interface 13 of the backup energy storage device C. In addition, the backup energy storage devices A, B and C can exchange data (including temperature, remaining power, current and voltage, etc.) with each other through their own communication modules 15.

At the beginning of operation, in the backup energy storage device C furthest from the load, the switch module 12 connects the AC output module 14 to the AC output interface 13, and enables the AC output module 14 to provide power energy for the load 16. In the backup energy storage device A and the backup energy storage device B, the switch module 12 connects the AC charging interface 11 to the AC output interface 13, and the AC output module 14 is in standby mode. At this time, the backup energy storage device C is in the power supply mode, while the backup energy storage devices A and B are in the wire mode. Meanwhile, the AC output modules 14 of the backup energy storage device A and B can be standby to reduce energy consumption.

After operation, the backup energy storage devices A, B and C can mutual exchange information through the respective communication module 15. When the electric quantity of the backup energy storage device C reaches the electric quantity threshold, the communication module 15 of the backup energy storage device C will notify the backup energy storage device B to start the AC output module 14 of the backup energy storage device B, and then switch the switch module 12 of backup energy storage device B to connect the AC output module 14 of backup energy storage device B to the AC output interface 13 before the backup energy storage device C stops working. When the backup energy storage device C stops working, the backup energy storage device B provides power energy for the load 16, the backup energy storage device B is in the power supply mode, and the backup energy storage device A is equivalent to in the wire mode, so as to complete the power switchover.

This parallel switching system 100 can make the use of the load 16 longer and multiple backup type energy storage devices 10 can be in series, and obtaining numbers according to the order of the various access Wi-Fi hotspots. The first backup type energy storage device 10 accessing the Wi-Fi hotspot notes for No. 1 (the backup energy storage device A), the AC output interface 13 is directly connected with the load 16. The second backup energy storage device 10 accessing the Wi-Fi hotspot notes for No. 2 (the backup energy storage device B), and the AC output interface 13 is connected to the AC charging interface 11 of the unit 1. The third backup energy storage device 10 accessing the Wi-Fi hotspot notes for No. 3 (the backup energy storage device C), and the AC output interface 13 is connected to the AC charging interface 11 of the unit 2, so as to obtain the parallel switching system 100 in series. When the parallel switching system 100 is used, No. 3 device first supplies energy to the load 16, the No. 2 device and the No. 1 device are responsible for energy transfer, but do not consume their own energy. In addition, the No. 3 device will communicate with the No. 2 and 1 devices regularly to feedback the current electricity, temperature and other information.

Figure 6:
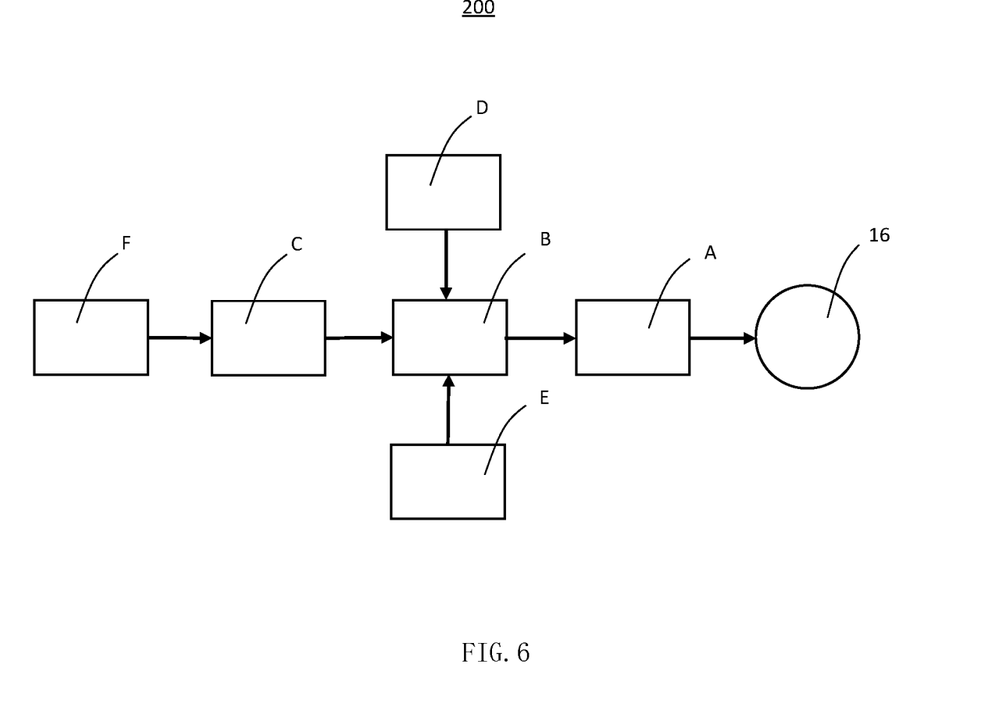
FIG. 6 is a schematic diagram of multiple backup energy storage devices connected and arranged in a star shape according to the present invention.

Further, the series connection mode can also be changed into a star shape, a network shape or other connection modes. It only needs to ensure that there is a system outside the device to supply power, and there is a system to supply power to the load 16. As shown in FIG. 6, another embodiment of the present disclosure is a parallel switching system 200, which comprises six backup energy storage devices 10 connected in series with each other. The AC load 16 is connected with the AC output interface 13 of backup energy storage device A, the AC charging interface 11 of the backup energy storage device A is connected to the AC output interface 13 of the backup energy storage device B, the AC output interface 13 of the backup energy storage devices C, D, and E is respectively connected to the AC charging interface 11 of the backup energy storage device B, and the AC charging interface of the backup energy storage device C 11 is connected with the AC output interface 13 of the backup energy storage device F. In addition, each backup energy storage devices 10 is numbered according to the sequence of access to Wi-Fi hotspot according to the above-mentioned method of the present disclosure. The backup energy storage device A is connected to the load 16 and connected to the Wi-Fi hotspot, which is recorded as No. 1 device (the backup energy storage device A). Connecting the backup energy storage device 10 to the parallel switching system 200 and the Wi-Fi hotspots in sequence, and record them as No. 2 device (the backup energy storage device B), No. 3 device (the backup energy storage device C), No. 4 device (the backup energy storage device D), No. 5 device (the backup energy storage device E), and No. 6 device (the backup energy storage device F), respectively. The AC output interfaces 13 of the No. 3, No. 4 and No. 5 devices are respectively connected to the AC charging interface 11 of No. 2 device.

In this embodiment, if it is necessary to dismantle No. 3 device while using No. 6 device at the same time. Then, when No. 3 quits the Wi-Fi hotspot connection and disconnects the physical connection, it will notify the backup energy storage devices 10 with a larger number than No. 3 (i.e. No. 4, No. 5 and No. 6), and then the numbers of all backup energy storage devices 10 with a larger number than No. 3 will be reduced by 1, that is, No. 4 will become No. 3, No. 5 will become No. 4, and No. 6 will become No. 5.

If a backup energy storage device 10 needs to be added behind No. 3 device, connect the AC output interface 13 of the new backup energy storage device 10 to the AC charging interface 11 of No. 3 device, and mark it as No. 7 according to the sequence of Wi-Fi hotspot access, then the device replacement can be completed.

Figure 7:
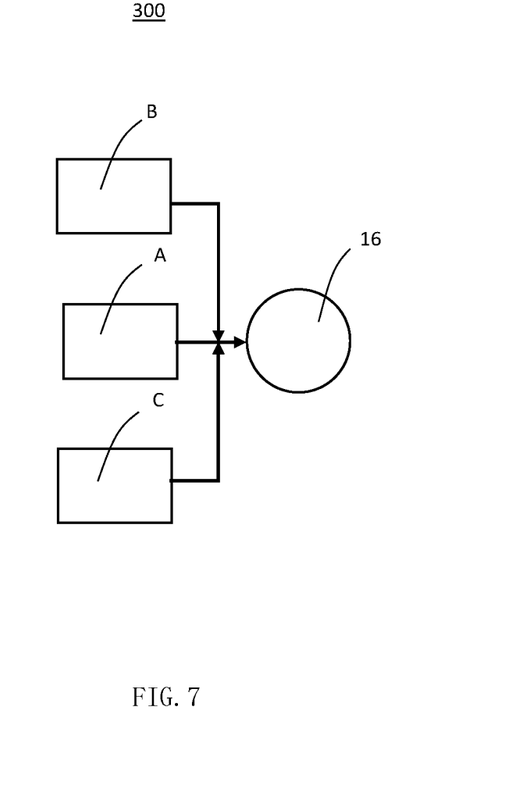
FIG. 7 is a schematic diagram of multiple backup energy storage devices arranged in parallel according to the present invention.

In order to increase the output power or reduce the current of a single system, another preferred embodiment of the parallel switching system 300 is disclosed, as shown in FIG. 7. The parallel switching system 300 includes three backup energy storage devices 10. The AC output interfaces 13 of the backup energy storage device A, B and C are respectively connected to the load 16. As describe above, the backup energy storage device A, the backup energy storage device B and the backup energy storage device C are numbered in the order of connecting to the Wi-Fi hotspot. The first backup energy storage device 10 accessing the WiFi hotspot is recorded as No. 1 (the backup energy storage device A), and its AC output interface 13 is directly connected to the load 16. The second backup energy storage device 10 accessing the Wi-Fi hotspot is recorded as No. 2 (the backup energy storage device B), and its AC output interface 13 is directly connected to load 16. The third backup energy storage device 10 accessing the Wi-Fi hotspot is recorded as No. 3 (the backup energy storage device C), and its AC output interface 13 is directly connected to load 16. That is, the AC output interfaces 13 of the backup energy storage devices A, B and C are respectively connected to the same load 16, so as to obtain the parallel switching system 300.

Figure 8:
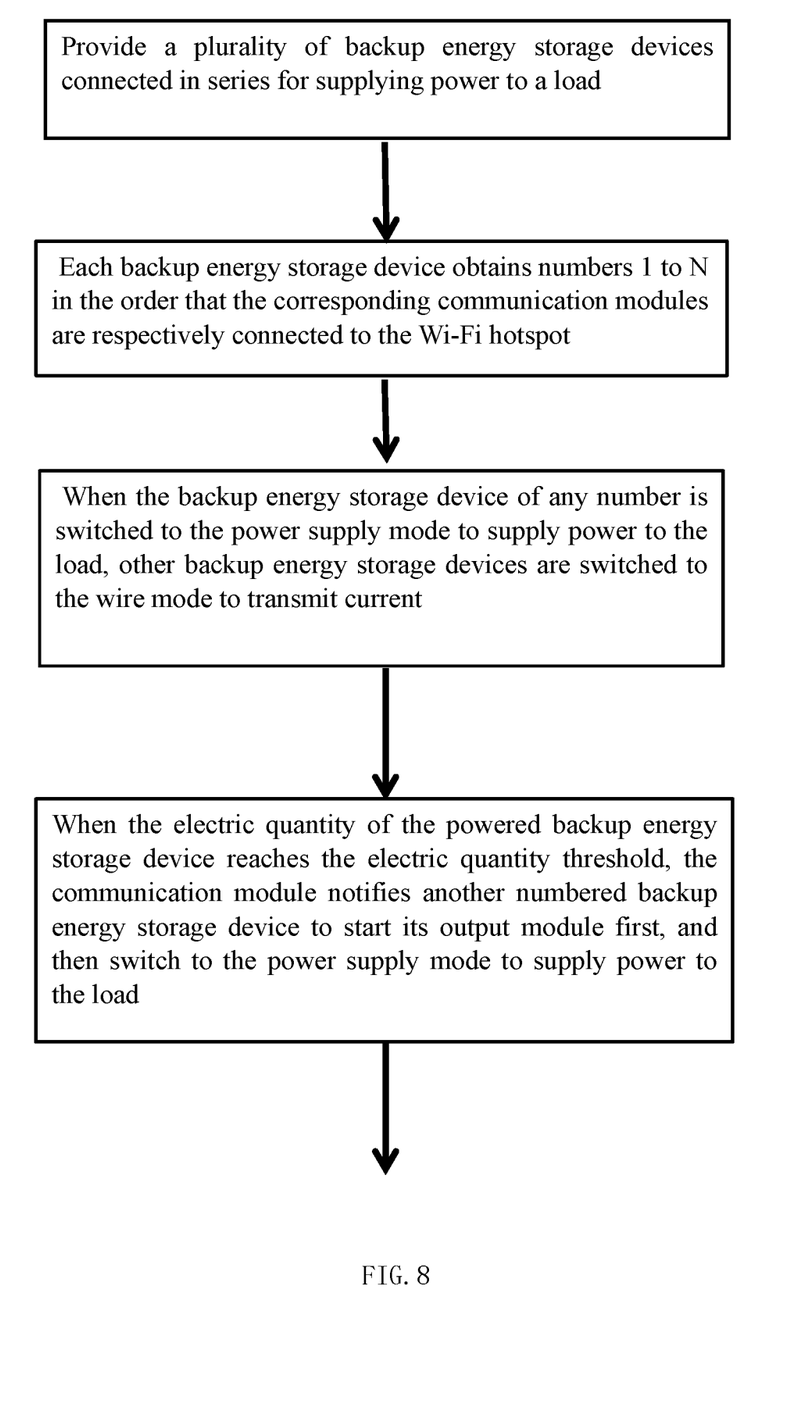
FIG. 8 is a flow chart of the parallel switching system operating in series according to the present invention.

As shown in FIG. 8, the scheduling method for collaborative work of multiple backup energy storage devices using Wi-Fi is described below. Each backup energy storage device 10 obtains numbers 1 to N in the order that the corresponding communication modules 15 are respectively connected to the Wi-Fi hotspot, and supplies power to the load 16 in the order of numbers 1 to N. When the backup energy storage device 10 of any number is switched to the power supply mode to supply power to the load 16, other backup energy storage devices 10 are switched to the wire mode to transmit current. When the electric quantity of the powered backup energy storage device 10 reaches the electric quantity threshold, the communication module 15 notifies another numbered backup energy storage device 10 to start its output module 14 first, and then switch to the power supply mode to supply power to the load 16. In addition, the parallel fast switching method referred to in the invention can be used in the form of AC input and AC output, and can also be used in the form of DC input and DC output.

Figure 9:
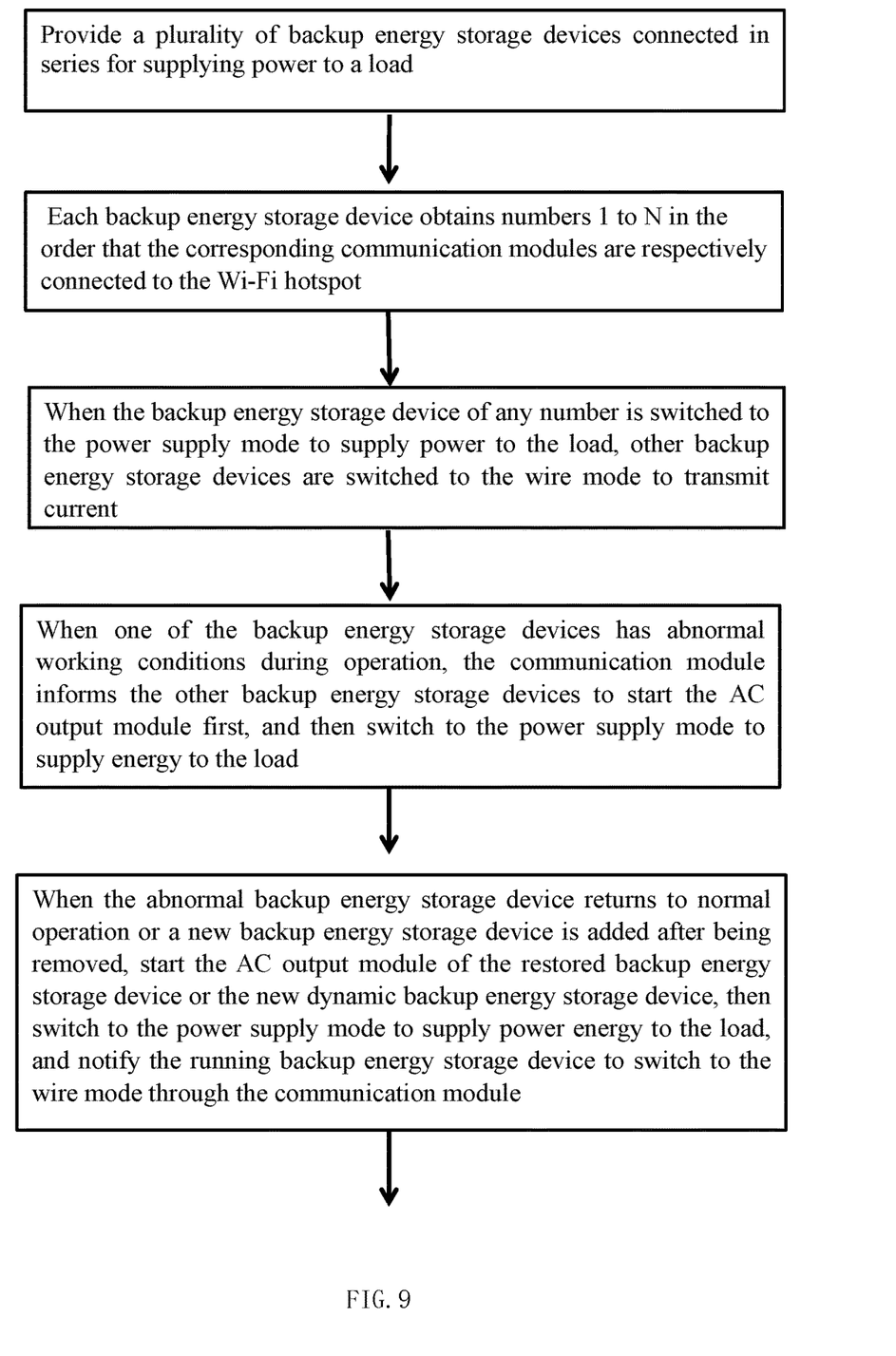
FIG. 9 is a flow chart of the parallel switching system in a abnormal operation according to the present invention.

As shown in FIG. 9, is some embodiments, the invention can also perform the following operations in the series operation of multiple backup energy storage devices 10. When one of the backup energy storage devices 10 has abnormal working conditions (such as high temperature) during operation, the communication module 15 informs the other backup energy storage devices 10 to start the AC output module 14 first, and then switch to the power supply mode to supply energy to the load 16. When the abnormal backup energy storage device 10 returns to normal operation or a new backup energy storage device 10 is added after being removed, start the AC output module 14 of the restored backup energy storage device 10 or the new dynamic backup energy storage system 10, then switch to the power supply mode to supply power energy to the load 16, and notify the running backup energy storage device 10 to switch to the wire mode through the communication module 15. At this time, the restored backup energy storage device 10 or the newly added backup energy storage device 10 supplies energy to the load 16, thus ensuring the stability of power supply for the load 16.

Figure 10:
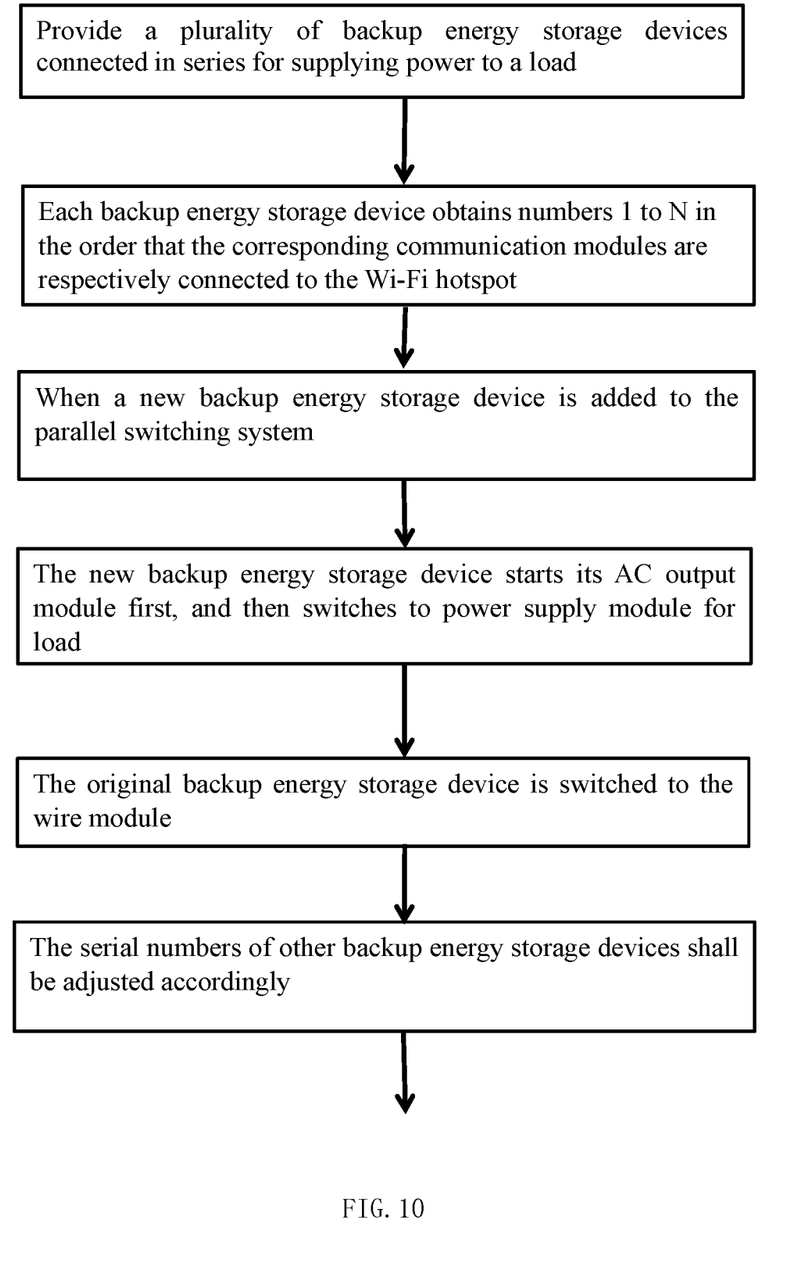
FIG. 10 is a flow chart of the parallel switching system when adding a new backup energy storage device into the parallel switching system according to the present invention.

As shown in FIG. 10, when a new backup energy storage device 10 is added to the parallel switching system, the new backup energy storage device 10 starts its AC output module 14 first, and then switches to power supply module for load 16. The original backup energy storage device 10 is switched to the wire module. The serial numbers of other backup energy storage devices 10 shall be adjusted accordingly.

In summary, multiple backup energy storage devices of the invention can work intelligently by relying on the scheduling method and have the advantages of intelligence, order and safety.

In the above-mentioned embodiments, it should be understood that the systems, devices and methods disclosed can be implemented in other ways. For example, the division of the module, which is only a logical function division, can be implemented in other ways, for example, multiple modules or components can be combined or integrated into another system, or some features can be ignored or not implemented. The coupling, or direct coupling, or communication connections between each other shown or discussed may be indirect coupling or communication connections through interfaces, devices, or modules, and may be electrical, mechanical, or otherwise.

In the embodiments provided in the present disclosure, it should be understood that the number of backup energy storage devices is for illustrative purposes only and that the ordering of multiple backup energy storage devices is represented by the ordering of N backup energy storage devices, which can be any positive integer greater than or equal to 2.

Modules described as separate parts may or may not be physically separate, and components shown as modules may or may not be physical modules, that is, may be located in one place, or may be distributed across multiple network modules. Part or all of the modules can be selected according to the actual needs to achieve the purpose of this embodiment.

In the above-mentioned embodiments, it may be implemented wholly or partially by software, hardware, firmware, or any combination thereof. When implemented using software, it can be implemented in whole or in part as a computer program product. The computer program product consists of one or more computer instructions. When the computer program instruction is loaded and executed on the computer, the process or function according to this application embodiment is generated in whole or in part. The computer may be a general-purpose computer, a dedicated computer, a computer network, or other programmable device. The computer command can be sent from a web site, computer, server, or data center over wires (such as coaxial cable, optical fiber, digital subscriber line, DSL) or wireless (such as infrared, wireless, microwave, etc.) to another web site, computer, server, or data center. The computer readable storage medium can be any available medium that the computer can access or a data storage device such as a server or data center containing one or more available media integration. The available media may be read-only memory (ROM), or random access memory (RAM), or magnetic media, such as floppy disks, hard disks, magnetic tapes, magnetic disks, or optical media, such as, Digital versatile disc (DVD) or semiconductor media such as solid state disk (SSD).

Compared with the prior art, the technical advantages of the present disclosure are as follows:

1. The existing parallel technology is to charge device 2 through the farthest device 1, the device 2 to charge the device 3. The system close to the load supplies power to the load. In this way, all the devices are in operation and the energy waste is serious. The backup energy storage device numbered 1 of the invention is connected to the load and supplies power to the load in the sequence numbered N to 1, that is, the furthest device is used to supply power to the load and the other devices are in standby state, thus greatly saving energy.

2. In the existing parallel technology, the device near the load end is always in working state, and the probability of failure is higher. The device near the load end of the invention is in standby state before working under load, which reduces the probability of failure.

3. In the existing parallel technology, all the devices are in working state. When the battery is about to run out, there may be some device energy surplus, some device energy consumption, and then the load can not work properly. In the present disclosure, each device successively carries out separate power supply work, so as to make the use of energy more thorough and the load electricity more stable.

4. When the parallel device with existing technology is in switch state, it will take more than 30 ms to switch because the standby device is not started in advance. The standby device of the present disclosure will start in advance, and the switching time is less than 10 ms, so that the system switching is more coherent and fast.

5. Once the expansion of the external energy storage device used in the existing technology is more and more, the overall weight will be more and more large, and the replacement of the external energy storage device can cause unstable load power supply. The present disclosure can flexibly add and remove energy consuming equipment, will not cause power supply instability, and is safer to use.

It should be noted that the present disclosure is not limited to the above embodiments. According to the creative spirit of the present disclosure, those skilled in the art can also make other modifications, which should not be interpreted as limiting the scope of the present disclosure. It should be noted that all modifications and substitutions equivalent to the embodiment should be included in the scope of the present disclosure. Therefore, the scope of protection of the present disclosure shall be subject to the scope defined in the claims.

What is claimed is:

1. A scheduling method for collaborative work of multi-device in a parallel switching system, the system comprising a plurality of backup energy storage devices, each backup energy storage devices comprising an AC charging interface, a switching module, an AC output interface, an AC output module, and a communication module, an output end of the switching module connected with the AC output interface, and an input end switched between the AC charging interface and the AC output module, enabling the backup energy storage device to be switched between a power supply mode and a wire mode, the method comprising:

provididing a load and N backup energy storage devices, N is a positive integer greater than or equal to 2; and connecting the AC output interfaces of the N backup energy storage devices to the load or assembling the AC charging interfaces of the N backup energy storage devices to form a parallel switching system and obtaining numbers 1 to N according to the sequence of the communication modules accessing Wi-Fi hotspots;

wherein when the backup energy storage device with any number is switched to the load in the power supply mode, the other backup energy storage devices are switched to the wire mode to transfer current.

2. The scheduling method for collaborative work of multi-device in a parallel switching system of claim 1, wherein the backup energy storage device with a larger number is first switched to provide power supply to the load in the power supply mode, while the other backup energy storage devices are switched to the wire mode to transfer current.

3. The scheduling method for collaborative work of multi-device in a parallel switching system of claim 2, wherein when the electric quantity of the backup energy storage device reaches the electric quantity threshold, the communication module of the backup energy storage device will notify another numbered backup energy storage device to start the AC output module, and then switch to provide power supply to the load in the power supply mode.

4. The scheduling method for collaborative work of multi-device in a parallel switching system of claim 3, wherein when the backup energy storage device is switched in the power supply mode, the original backup energy storage device providing power supply to the load exits the Wi-Fi hotspot and is replaced with a new backup energy storage device, and the new backup energy storage device continues to use the original number.

5. The scheduling method for collaborative work of multi-device in a parallel switching system of claim 2, wherein when the backup energy storage device for power supply does not work normally, the communication module of the backup energy storage device will notify another numbered backup energy storage device to start the AC output module, and then switch to provide power supply to the load in the power supply mode.

6. The scheduling method for collaborative work of multi-device in a parallel switching system of claim 5, wherein when the backup energy storage device originally supplied with power recovers, the output module is started, and then the power supply mode of the original backup energy storage device is switched again, and the backup energy storage device currently in operation is notified by the communication module of the original backup energy storage device to switch to the wire mode.

7. The scheduling method for collaborative work of multi-device in a parallel switching system of claim 5, wherein when a new backup energy storage device replaces the original backup energy storage device to provide power supply, the output module is started, and then the power supply mode of the original backup energy storage device is switched again, and the backup energy storage device currently in operation is notified by the communication module of the original backup energy storage device to switch to the wire mode.

8. The scheduling method for collaborative work of multi-device in a parallel switching system of claim 1, wherein when a new backup type energy storage devices, new backup type energy storage device is added to the parallel switching system, the AC output module of the new backup type energy storage device is started, and then the power supply module of the new backup type energy storage device is switched to provide power supply to the load, the original backup energy storage device is switched to the wire mode, and the numbers of the other backup energy storage devices are adjusted accordingly.

9. The scheduling method for collaborative work of multi-device in a parallel switching system of claim 1, wherein the plurality of backup energy storage devices are connected in a star shape, the AC output interface of one backup energy storage device is connected with the load, the AC output interface of another backup energy storage device is connected with the AC charging interface of the backup energy storage device, and the AC output interfaces of the other backup energy storage devices is connected with the AC charging interface of the other backup energy storage device.

10. The scheduling method for collaborative work of multi-device in a parallel switching system of claim 1, wherein the plurality of backup energy storage devices are in parallel and the AC output interface of each backup energy storage devices is connected to the load.

* * * * *